United States Patent
Lee et al.

(10) Patent No.: US 10,262,809 B2
(45) Date of Patent: Apr. 16, 2019

(54) ELECTRIC ENERGY STORAGE DEVICE HAVING IMPROVED TERMINAL STRUCTURE

(71) Applicant: LS Mtron Ltd., Anyang-si, Gyeonggi-do (KR)

(72) Inventors: Ha-Young Lee, Suwon-si (KR); Dong-Sup Kim, Anyang-si (KR); Sang-Hyun Bae, Anyang-si (KR); Ji-Eun Kang, Anyang-si (KR); Dong-Il Shin, Suwon-si (KR); Yu-Il Yoon, Seoul (KR); Hyun-Seok Ko, Gunpo-si (KR); Kyeong-Hoon Park, Ansan-si (KR)

(73) Assignee: LS MTRON LTD., Anyang-si, Gyeonggi-Do (KR)

( * ) Notice: Subject to any disclaimer, the term of this patent is extended or adjusted under 35 U.S.C. 154(b) by 0 days.

(21) Appl. No.: 15/543,276

(22) PCT Filed: Sep. 14, 2015

(86) PCT No.: PCT/KR2015/009629
§ 371 (c)(1),
(2) Date: Jul. 13, 2017

(87) PCT Pub. No.: WO2016/114472
PCT Pub. Date: Jul. 21, 2016

(65) Prior Publication Data
US 2017/0372849 A1    Dec. 28, 2017

(30) Foreign Application Priority Data
Jan. 14, 2015    (KR) .................. 10-2015-0006832

(51) Int. Cl.
*H01G 11/74*    (2013.01)
*H01G 11/78*    (2013.01)
(Continued)

(52) U.S. Cl.
CPC ............. *H01G 11/26* (2013.01); *H01G 11/70* (2013.01); *H01G 11/74* (2013.01); *H01G 11/82* (2013.01);
(Continued)

(58) Field of Classification Search
None
See application file for complete search history.

(56) References Cited

U.S. PATENT DOCUMENTS 6,310,756 B1 * 10/2001 Miura .................. H01G 9/00
                                                  361/301.3
7,817,404 B2 * 10/2010 Miura .................. H01G 9/10
                                                  29/25.03
(Continued)

FOREIGN PATENT DOCUMENTS

CN        203192894 U    9/2013
JP        2006-324641 A  11/2006
(Continued)

OTHER PUBLICATIONS

English language translation of KR 101296224.*
(Continued)

*Primary Examiner* — Dion Ferguson
(74) *Attorney, Agent, or Firm* — K&L Gates LLP

(57) ABSTRACT

An electric energy storage device has an inner terminal disposed in a cylindrical metal case and connected to an electrode of a bare cell, wherein the inner terminal includes a plate-shaped terminal body having a circular outer circumference; at least one electrolyte impregnation hole formed through the terminal body in a thickness direction; a flange located at the outer circumference of the terminal body and extending perpendicular to a plane of the terminal body; and a spacer formed to protrude at a periphery of at least one impregnation hole among the impregnation holes (Continued)

or formed by protruding a part of the plane of the terminal body.

12 Claims, 16 Drawing Sheets

(51) Int. Cl.
  *H01G 11/26* (2013.01)
  *H01G 11/70* (2013.01)
  *H01G 11/82* (2013.01)

(52) U.S. Cl.
  CPC .............. *H01G 11/78* (2013.01); *Y02E 60/13* (2013.01); *Y02T 10/7022* (2013.01)

(56) References Cited

U.S. PATENT DOCUMENTS

| | | | | |
|---|---|---|---|---|
| 9,111,693 | B2* | 8/2015 | Madiberk | .............. H01G 11/84 |
| 2006/0034036 | A1* | 2/2006 | Miura | ...................... H01G 9/04 |
| | | | | 361/511 |
| 2014/0268496 | A1* | 9/2014 | Lee | .................... B23K 26/0823 |
| | | | | 361/502 |
| 2014/0293510 | A1* | 10/2014 | Miura | ..................... H01M 2/06 |
| | | | | 361/502 |
| 2016/0247637 | A1* | 8/2016 | Nansaka | ................. H01G 11/74 |
| 2017/0372844 | A1* | 12/2017 | Lee | ......................... H01G 9/008 |
| 2017/0372848 | A1* | 12/2017 | Yoon | ...................... H01G 11/82 |

FOREIGN PATENT DOCUMENTS

| | | |
|---|---|---|
| JP | 2009-266873 A | 11/2009 |
| KR | 10-1211916 B1 | 12/2012 |
| KR | 10-1288531 B1 | 8/2013 |
| KR | 10-1296224 B1 | 9/2013 |
| KR | 101345224 B1 | 12/2013 |

OTHER PUBLICATIONS

Search Report, dated Jan. 7, 2016, for International Application No. PCT/KR2015/009629.

Written Opinion, dated Jan. 7, 2016, for International Application No. PCT/KR2015/009629.

* cited by examiner

ELECTRIC ENERGY STORAGE DEVICE HAVING IMPROVED TERMINAL STRUCTURE

CROSS-REFERENCE TO RELATED APPLICATION(S)

The present application is a U.S. National Phase entry from International Application No. PCT/KR2015/009629, filed Sep. 14, 2015, which claims priority to Korean Patent Application No. 10-2015-0006832, filed Jan. 14, 2015, the disclosure of which is incorporated by reference herein in its entirety.

BACKGROUND OF THE INVENTION

1. Field of the Invention

The present disclosure relates to an electric energy storage device, and more particularly, to an electric energy storage device having a plate-shaped inner terminal.

2. Description of Related Art

A high capacitance storage device, which is regarded as a next-generation electric energy storage device, includes a ultra-capacitor (UC), a super capacitor (SC), an electric double layer capacitor (EDLC) and the like, which are a kind of capacitor, and it is an energy storage device having an intermediate property between an electrolytic condenser and a secondary battery, which can be used in combination with, or in place of, a secondary battery due to its high efficiency and semi-permanent life span.

The high capacitance storage device is sometimes used in place of a battery for applications which do not ensure easy maintenance and demand long service life. The high capacitance storage device has fast charging/discharging characteristics and thus is very suitable not only as an auxiliary power source for mobile communication information devices such as a mobile phone, a notebook and a PDA but also as a main or auxiliary power source of an electric vehicle, a night road pilot lamp, an uninterrupted power supply (UPS) and the like, which demand high capacity, and is widely used for such purposes.

The high capacitance storage device generally has a cylindrical shape as shown in FIG. 1 for a small size.

Referring to FIG. 1, a high capacitance storage device includes a bare cell 10 composed of a positive electrode, a negative electrode, a separator and an electrolyte and received in an inner housing, a metal case 40 accommodating the bare cell 10, a negative electrode outer terminal 70 located at a top portion of the metal case 40, a negative electrode inner terminal 20 and a positive electrode inner terminal 30 coupled to upper and lower portions of the metal case 40 to be connected to negative and positive electrodes of the bare cell 10, respectively, and substantially having a plate shape, and a positive electrode outer terminal 80 located at a lower portion of the metal case 40.

The negative electrode inner terminal 20 is insulated against the metal case 40 by an insulation member 60 and simultaneously contacts a top plate member 50, and the positive electrode inner terminal 30 is in contact with the metal case 40.

The negative electrode outer terminal 70 is formed to protrude upward at a center of an upper end of the top plate member 50. The top plate member 50 is fitted in the top portion of the metal case 40 so that its opening is sealed. The positive electrode outer terminal 80 is electrically connected to the positive electrode inner terminal 30 and is provided at a center of a lower end of the metal case 40.

In recent years, the negative electrode inner terminal 20 and the positive electrode inner terminal 30 are generally formed in a substantial plate shape in order to expand an inner space of the metal case 40.

FIG. 2 shows the configuration of the negative electrode inner terminal 20 in detail. This configuration may be equally applicable to the positive electrode inner terminal 30.

As shown in FIG. 2, the negative electrode inner terminal 20 includes a terminal body 21 with a flat shape, an electrolyte impregnation hole 22 formed through the terminal body 21 in a thickness direction, and a flange 23 extending perpendicular to the plane of the terminal body 21 at an outer circumference of the terminal body 21.

However, an existing inner terminal having the above structure is disadvantageous in that it may not be easily handled during an automation process for component insertion or the like. In other words, during the automation process, a plurality of inner terminals are stacked up and down and transferred in an overlapped state, but during this process, as shown in FIG. 3, any one inner terminal 20 may be tightly coupled to an inner side of another inner terminal 20 and is tightly attached thereto without being easily separated therefrom. In this case, the automation process is stopped to deteriorate the production efficiency, and also the surface of the inner terminal may be damaged to increase the internal resistance.

Meanwhile, in a high capacitance storage device, a side reaction occurs at an interface between an electrolyte and an electrode when an abnormal operation such as overcharge, overdischarge and overvoltage takes place at room temperature, thereby generating gas as a byproduct. If the gas is generated and accumulated inside, the internal pressure of the metal case 40 continuously increases, and eventually the metal case 40 is deformed or the explosion occurs in the worst case.

In consideration of such gas generation, in the existing technique, the high capacitance storage device is designed to have a predetermined space between the inner surface of the metal case 40 and the bare cell 10, or a safety valve 91 is installed in a hollow 90 formed in the negative electrode outer terminal 70 and the top plate member 50 to discharge gas.

However, if the high capacitance storage device is designed to have a space between the metal case 40 and the bare cell 10, the bare cell 10 may be moved to the left and right by the vibration applied from the outside, and thus the top plate member 50 and the negative electrode inner terminal 20 may be separated to cause a contact failure.

In addition, the hollow 90 formed in the negative electrode outer terminal 70 and the top plate member 50 is used not only as a space for installing the safety valve 91 but also as a path for injecting an electrolyte and an air vent for a vacuum operation. Here, since the hollow 90 should be formed in consideration of the installation of the safety valve 91, there are many limitations in its design. Moreover, in recent years, as the high capacitance storage device becomes designed smaller, the sizes of the safety valve 91 and the hollow 90 are gradually becoming smaller. Thus, as the hollow 90 is miniaturized, the electrolyte may not be easily injected for electrolyte impregnation, and the vacuum operation takes long time, thereby lowering the productivity.

SUMMARY

The present disclosure is designed to solve the problems of the related art, and therefore the present disclosure is directed to providing an electric energy storage device configured so that inner terminals may be easily removed in a state where the inner terminals are overlapped with each other during an automation process or configured so that the inner terminals are not overlapped with each other.

The present disclosure is also directed to providing an electric energy storage device which may improve pressure resistance and electrolyte impregnation while ensuring vibration resistance against external forces such as vibration since an inner space and an electrolyte passage between a terminal and a bare cell may be increased.

The present disclosure is also directed to providing an electric energy storage device which may reduce the volume and weight by simplifying the terminal structure and improve productivity by reducing the cost and time of the manufacturing process.

The present disclosure is also directed to providing an electric energy storage device which may improve the resistance characteristics by increasing a contact area between a terminal and a bare cell and enhancing the contact stability.

In one aspect of the present disclosure, there is provided an electric energy storage device having an inner terminal disposed in a cylindrical metal case and connected to an electrode of a bare cell, wherein the inner terminal includes: a plate-shaped terminal body having a circular outer circumference; at least one electrolyte impregnation hole formed through the terminal body in a thickness direction; a flange located at the outer circumference of the terminal body and extending perpendicular to a plane of the terminal body; and a spacer formed to protrude at a periphery of at least one impregnation hole among the impregnation holes or formed by protruding a part of the plane of the terminal body.

Among the impregnation holes, any one impregnation hole may be formed so that a center thereof coincides with a center of the terminal body, and the other impregnation holes may be formed to have the same distance between centers of adjacent impregnation holes and formed along a circumferential direction to have the same distance from the center of the terminal body, and among the impregnation holes formed along a circumferential direction based on the center of the terminal body, the impregnation holes having the spacer and the impregnation holes not having the spacer may be alternately located.

The impregnation holes having the spacer may be arranged in a triangular form based on the center of the terminal body.

A protruding height of the spacer may be 80 to 120% of the height of the flange.

The spacer may be formed to be perpendicular to the plane of the inner terminal body or to have a predetermined angle thereto.

Preferably, the terminal body may be provided to face the bare cell and coupled thereto to make surface contact, a portion of a side of the metal case corresponding to the inner terminal may be formed to have a greater thickness than the other portion of the side, the flange may be formed to have a lower height in comparison to the height of the thick side of the metal case, a beading portion may be formed at the metal case by beading a part of a side of the inner terminal at a portion corresponding to the flange so that the beading portion is closely adhered to the flange when the flange is deformed, and the inner terminal may be secured and fixed by means of the beading portion.

The flange of the inner terminal may be formed to have a greater height in comparison to the height of a beading portion formed at the metal case.

The electric energy storage device according to the present disclosure may further comprise a top plate member fitted in a top portion of the metal case to seal an opening of the metal case, the top plate member having a circular outer circumference, wherein the top plate member may include a coupling protrusion formed at a lower side thereof concentrically with the circular outer circumference and protruding to open the inside thereof, and the top plate member is inserted into the flange of the inner terminal to give an inner space between the top plate member and the inner terminal, wherein a hollow may be formed at a center of the top plate member to inject an electrolyte, and wherein an electrolyte leakage prevention unit having a gradient to protrude downwards may be formed around the hollow at the lower surface of the top plate member.

The flange of the inner terminal may be formed to have a smaller height in comparison to the height of the coupling protrusion of the top plate member, and the coupling protrusion of the top plate member may be dented inwards from the circular outer circumference corresponding to the thickness of the flange of the inner terminal.

The flange of the inner terminal may be coupled to the coupling protrusion of the top plate member by means of laser welding.

The coupling protrusion of the top plate member may have a beading groove formed along an outer circumferential surface thereof, and a coupling portion formed at a lower end thereof and coupled to the flange of the inner terminal, the flange of the inner terminal may be formed to have a height corresponding to the coupling portion, and a beading portion may be formed at the metal case so that the beading portion is closely adhered only to the beading groove.

The coupling protrusion of the top plate member may have a beading groove formed along an outer circumferential surface thereof, the flange of the inner terminal may be formed with a height enough to cover the beading groove, and a beading portion may be formed at the metal case so that the beading portion is closely adhered to the beading groove when the flange of the inner terminal is deformed.

Advantageous Effects

According to the present disclosure, the electric energy storage device gives the following effects.

First, it is possible to improve the product production efficiency by solving the problem that the inner terminals are tightly coupled with each other in an overlapped state and thus are not easily separated during an automation process.

Second, when handling the inner terminals, it is possible to minimize the interference between the inner terminals, thereby preventing surface damage and reducing internal resistance and leakage current.

Third, since the terminal body is reinforced by the spacer to enhance the durability, it is easy to design the inner terminal with a lower height. Accordingly, it is possible to expand the internal space of the metal case, and thus the internal pressure may be lowered to improve stability and service life.

Fourth, it is possible to increase the inner space and the electrolyte passage between the terminal and the bare cell while ensuring the vibration resistance against the external force such as vibration, thereby improving the pressure resistance and the electrolyte impregnation.

Fifth, by means of the simplification of the terminal structure, the volume and weight of the terminal may be reduced, and the cost and time of the manufacturing process may be reduced, thereby improving the productivity.

Sixth, the resistance characteristics may be improved by increasing the contact area between terminal and the bare cell and improving contact stability.

BRIEF DESCRIPTION OF DRAWINGS

FIG. 6b is a perspective view showing a modification of FIG. 6a.

FIG. 7a is a perspective view showing that an electrolyte discharge hole is added to the structure of FIG. 6a.

FIG. 9 is a perspective view showing a modification of FIG. 6a.

DETAILED DESCRIPTION OF THE INVENTION

Figure 1:
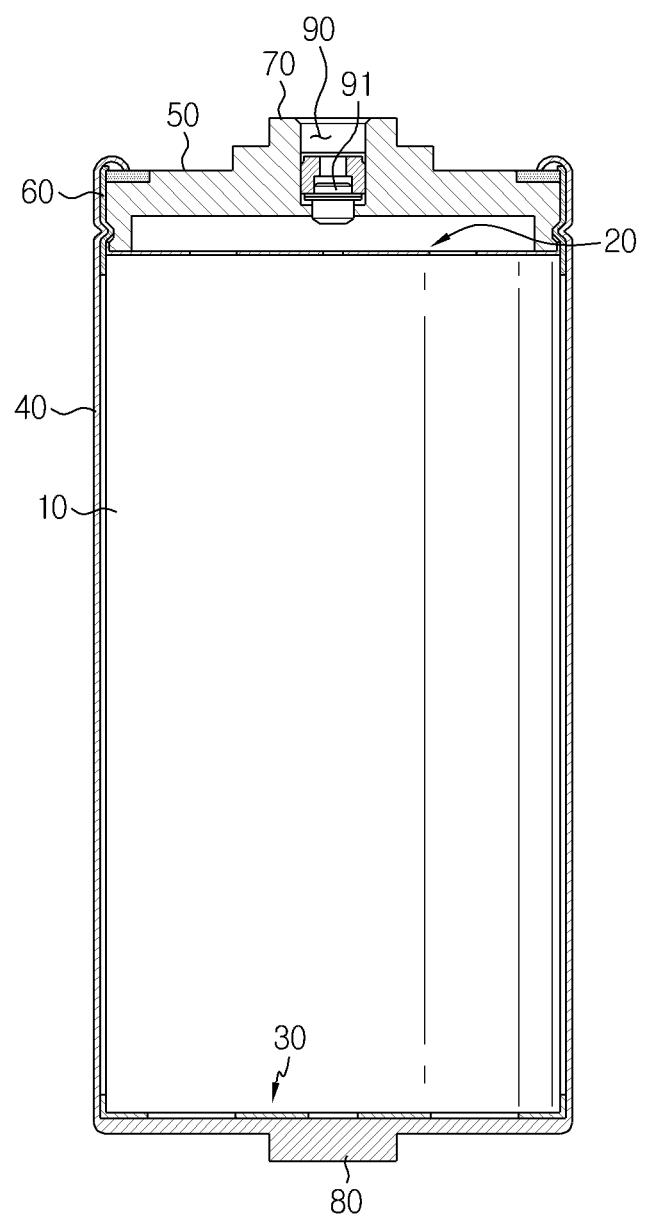
FIG. 1 is a cross-sectional view showing an existing electric energy storage device.
Figure 2:
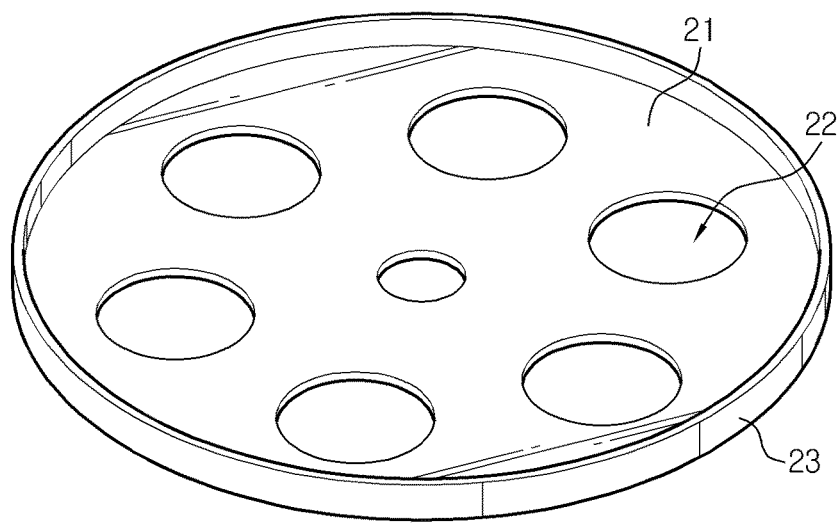
FIG. 2 is a perspective view showing an inner terminal depicted in FIG. 1.
Figure 3:
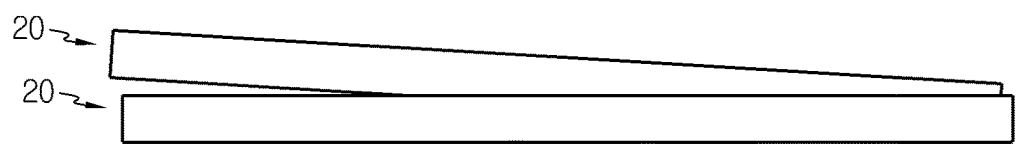
FIG. 3 is a side view showing that inner terminals are tightly engaged with each other in the existing technique.
Figure 4:
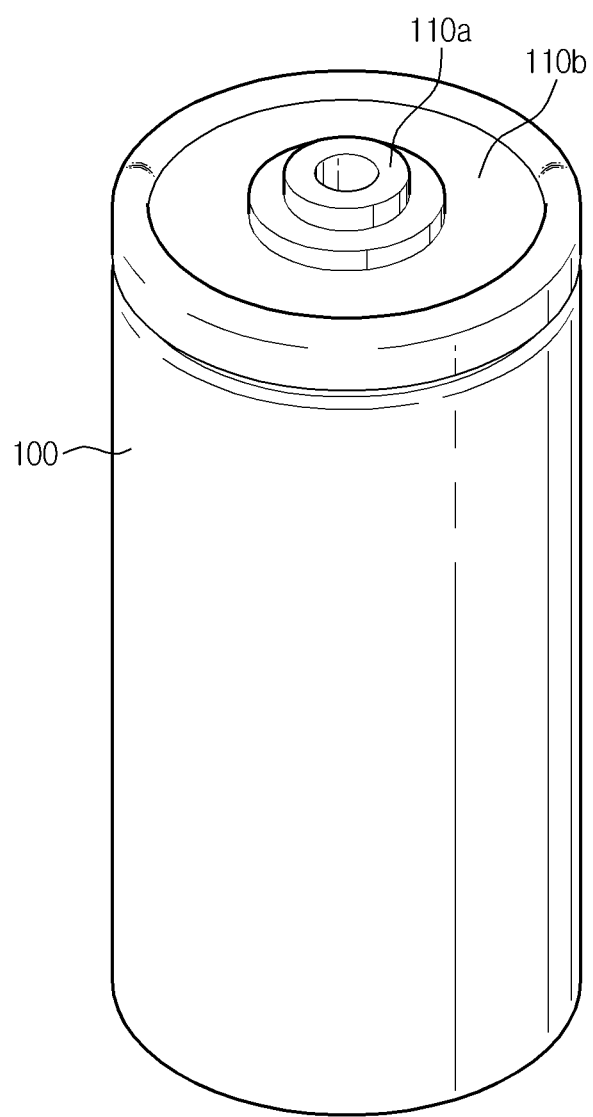
FIG. 4 is a perspective view showing an appearance of an electric energy storage device having an inner terminal according to an embodiment of the present disclosure.
Figure 5:
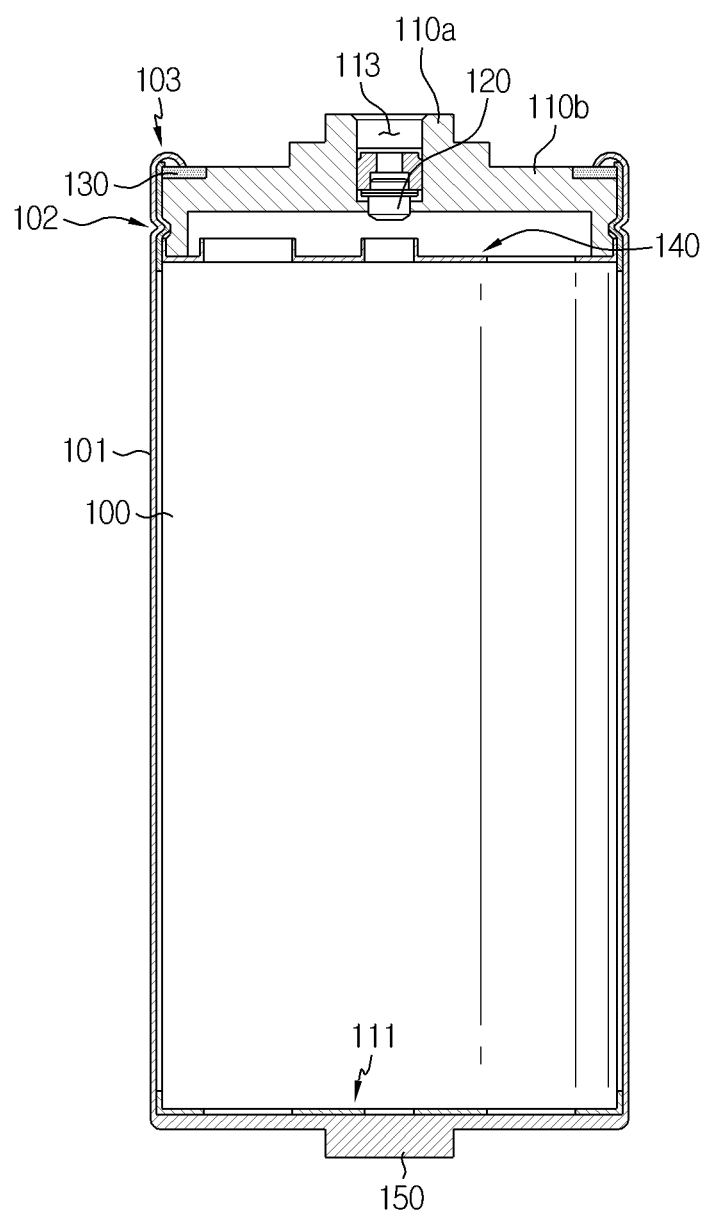
FIG. 5 is a cross-sectional view of FIG. 4.

FIG. 4 is a perspective view showing an appearance of an electric energy storage device having an inner terminal according to an embodiment of the present disclosure, and FIG. 5 is a cross-sectional view of FIG. 4.

Referring to FIGS. 4 and 5, an electric energy storage device according to an embodiment of the present disclosure includes a bare cell 100, a metal case 101 accommodating the bare cell 100, a negative electrode outer terminal 110a located at a top portion of the metal case 101, a negative electrode inner terminal 140 disposed at the inside of the metal case 101 and connected to a negative electrode of the bare cell 100, a positive electrode outer terminal 150 located at a lower portion of the metal case 101, and a positive electrode inner terminal 111 disposed at the inside of the metal case 101 and connected to a positive electrode of the bare cell 100.

The bare cell 100 includes a positive electrode, a negative electrode, a separator and an electrolyte and gives an electrochemical energy storage function. A normal jelly roll may be employed as the bare cell 100, and it is not described in detail here.

The metal case 101 has a cylindrical body having an inner space capable of accommodating the bare cell 100 which is processed as a wound element and then contained in an inner housing. Preferably, the metal case 101 may be made in the form of an aluminum cylinder.

The negative electrode outer terminal 110a is formed to protrude upward at the center of a top end of the top plate member 110b. The top plate member 110b is fitted into a top portion of the metal case 101 to seal the opening. In addition, the top plate member 110b has a circular outer circumferential surface corresponding to the inner circumferential surface of the metal case 101, and the upper and lower surfaces thereof may have various three-dimensional shapes. An edge of the top plate member 110b is adjacent to the curling unit 103 with the insulation member 130 being interposed therebetween.

A through hole 113 extending in a thickness direction is formed at the center of the negative electrode outer terminal 110a. The through hole 113 is used not only as a space for installing an automatic reset safety valve 120 but also as a path for injecting an electrolyte and an air vent for a vacuum operation.

The top plate member 110b is fixed to the metal case 101 by means of beading for the metal case 101. Accordingly, a beading portion 102 is formed at an outer portion of the metal case 101 corresponding to the top plate member 110b.

The negative electrode inner terminal 140 is coupled to the top plate member 110b at its top portion and connected to a negative electrode of the bare cell 100 at its lower portion.

The positive electrode outer terminal 150 is provided at a lower portion of the metal case 101, which is integrally connected to the side of the case.

The positive electrode inner terminal 111 is electrically connected to the positive electrode outer terminal 150 at the inside of the metal case 101 and also connected to the positive electrode of the bare cell 100.

Figure 6A:
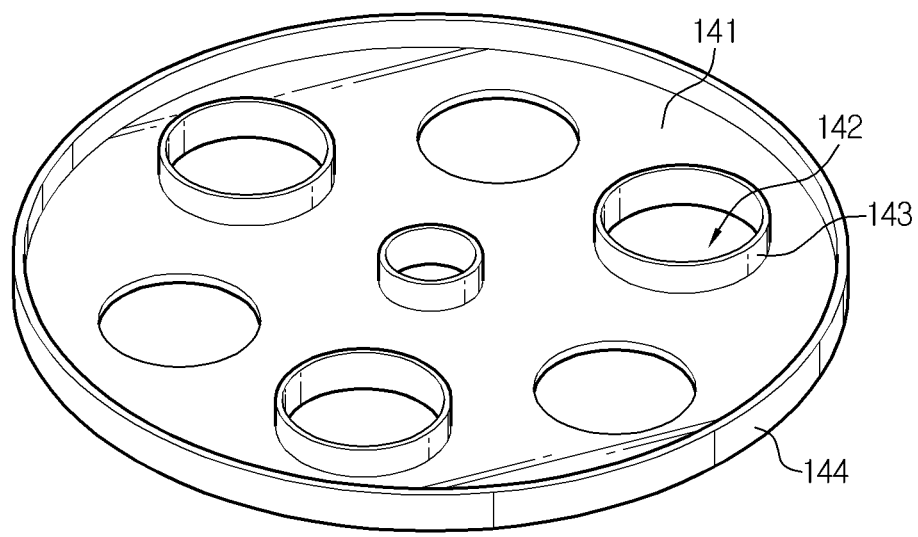
FIG. 6a is a perspective view showing a negative electrode inner terminal depicted in FIG. 4.

FIG. 6a shows the structure of the negative electrode inner terminal 140 in more detail. As shown in the figure, the negative electrode inner terminal 140 includes a plate-shaped terminal body 141 having a circular outer circumference, a plurality of electrolyte impregnation holes 142 formed in the terminal body 141, a spacer 143 protruding from the upper surface of the terminal body 141, and a flange 144 formed at an outer circumference of the body 141. In the present disclosure, this structure of the inner terminal is also applicable to the positive electrode inner terminal 111, but hereinafter, the structure of the present disclosure will be described with reference to an example applied to the negative electrode inner terminal 140.

The electrolyte impregnation hole 142 is formed through the terminal body 141 in a thickness direction to provide a passage for a liquid electrolyte during an electrolyte injection process. For uniform movement of the electrolyte, it is preferable that most of the plurality of electrolyte impregnation holes 142 are formed at regular intervals along a circumferential direction of the terminal body 141 and any one of them is formed at a center of the terminal body 141.

The spacer 143 protrudes from one side of the terminal body 141 to provide a spacing function so that different inner terminals 140 maintain a proper distance without being tightly fitted, when being overlapped with each other during an automation process.

The spacer 143 is formed by burring a periphery of the electrolyte impregnation hole 142 to protrude a predetermined height from one surface of the terminal body 141.

Figure 6B:
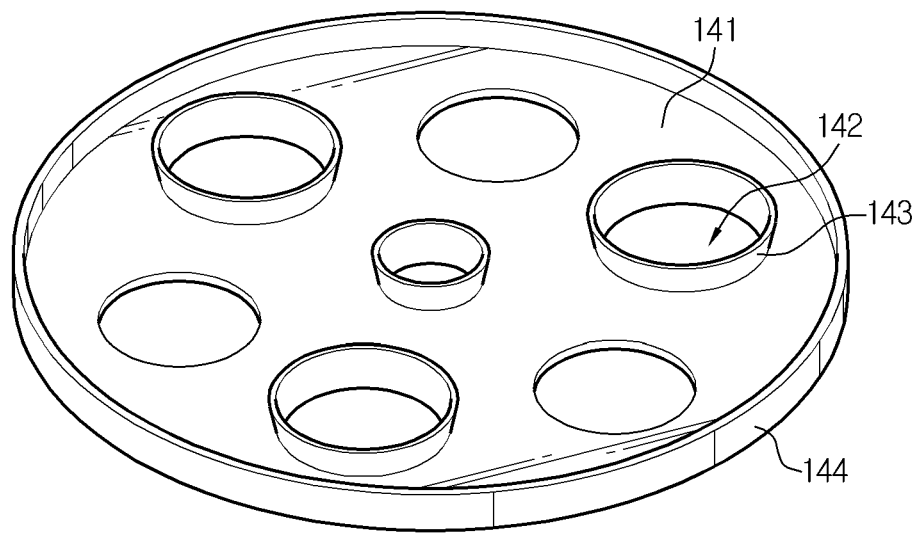

As shown in FIG. 6a, the spacer 143 may be formed to be perpendicular to the upper surface of the terminal body 141, or as shown in FIG. 6b, the spacer 143 may be formed with a predetermined angle from the upper surface of the terminal body 141 without being not perpendicular thereto. If the spacer 143 is formed with a predetermined angle, when an electrolyte is supplied into the case 101 through the through hole 113 of the negative electrode outer terminal 110, an electrolyte dropping to the inner terminal 140 along the lower surface of the negative electrode outer terminal 110 may easily flow below the hole 142 through the spacer 143 formed with a predetermined angle with respect to the upper surface of the terminal body 141, thereby reducing the time for the electrolyte solution to be impregnated.

Among the impregnation holes 142, any one impregnation hole 142 is formed so that its center coincides with the center of the terminal body 141, and the other impregnation holes 142 have the same distance between centers of adjacent impregnation holes 142 and formed along a circumferential direction to have the same distance from the center of the terminal body 141. Also, among the impregnation holes 142 located along a circumferential direction based on the center of the terminal body 141, the impregnation holes 142 having the spacer 143 and the impregnation holes 142 not having the spacer 143 may be alternately located to provide a generally balanced spacing function so that different inner terminals 140 are not engaged with into each other.

If the spacer 143 is formed asymmetrically with respect to the center of the terminal body 141, the inner terminals 140 are tilted to one side when the inner terminals 140 are overlapped with each other, and thus different inner terminals 140 may be engaged with each other. In order to solve this problem, the impregnation holes 142 having the spacer 143 are preferably arranged to surround the center of the terminal body 141 in a triangular form, namely arranged symmetrically with respect to the center of the terminal body 141.

Figure 7A:
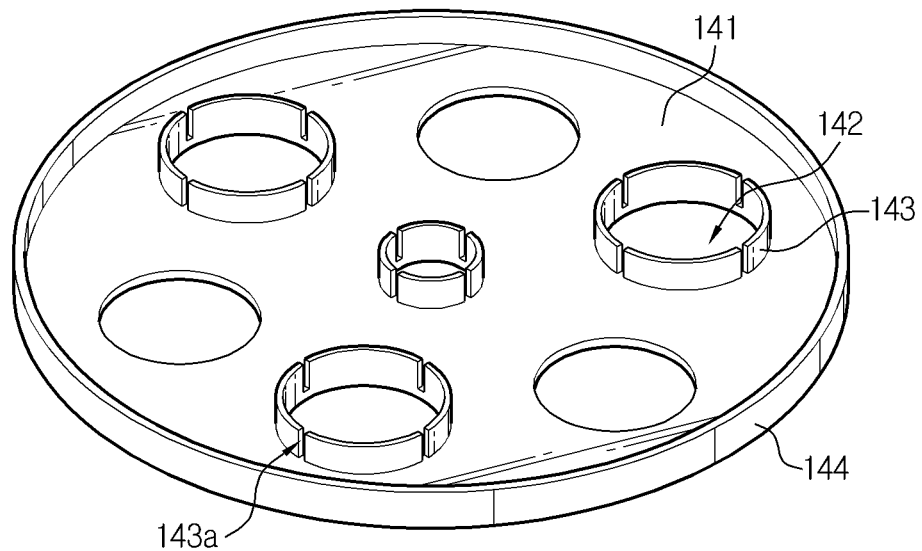

As shown in FIG. 7a, at least one electrolyte discharge hole 143a may be added to the periphery of the spacer 143. The electrolyte discharge hole 143a is formed to pass through the inside of the spacer 143 and serves to discharge the electrolyte remaining around the periphery of the spacer 143 to the electrolyte impregnation hole 142 located in the inner region of the spacer 143. The electrolyte discharge hole 143a may extend vertically from the lower end to the upper end of the spacer 143 and may be formed through hole machining along the lower end of the spacer 143.

Figure 7B:
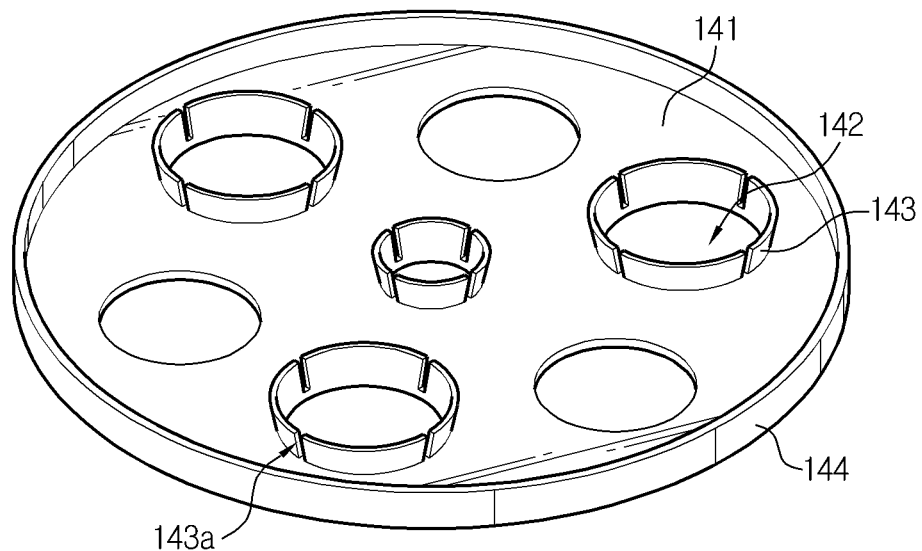
FIG. 7b is a perspective view showing that an electrolyte discharge hole is added to the structure of FIG. 6b.

In addition, as shown in FIG. 7b, at least one electrolyte discharge hole 143a may be added to the periphery of the deformed spacer 143. As the electrolyte discharge hole 143a is formed at the periphery of the spacer 143, the electrolyte remaining around the periphery of the spacer 143 is discharged to the electrolyte impregnation hole 142 located in the inner region of the spacer 143, thereby allowing easy movement of the electrolyte.

Figure 8A:
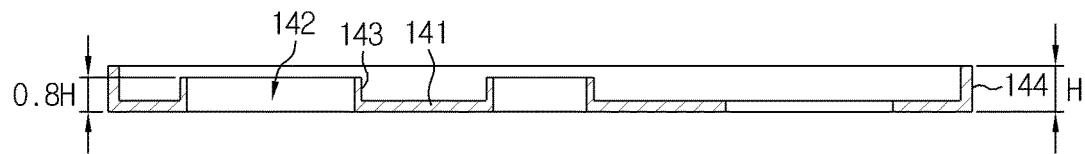
FIGS. 8a and 8b are cross-sectional views showing a height relation between a spacer and a flange.
Figure 8B:
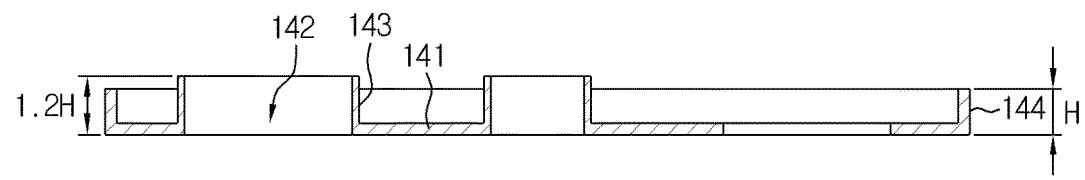

As shown in FIGS. 8a and 8b, the flange 144 is configured to extend with respect to a plane of the terminal body 141. The protruding height of the spacer 143 may be designed to be equal to or less than the height H of the flange 144. In this case, the protruding height of the spacer 143 may be 80% or more of the height of the flange 144. For example, the height of the flange 144 may be designed to be 1.5T and the protruding height of the spacer 143 may be designed to be 1.2T. Meanwhile, when the protruding height of the spacer 143 exceeds the height of the flange 144, the protruding height of the spacer 143 may be designed slightly higher to the level of 120%.

If the protruding height of the spacer 143 is designed to be less than 80% of the height H of the flange 144, any one inner terminal may be fitted into another inner terminal, and thus the technical object of the present disclosure may not be accomplished. If the protruding height of the spacer 143 exceeds 120% of the height of the flange 144, the inner terminals 140 may not be stacked easily, and even though the inner terminals 140 are stacked, the inner terminals 140 are highly likely to collapse and thus are not easily transported in an automation line. Thus, the protruding height of the spacer 143 may be designed to be 80% to 120% of the height of the flange 144.

Figure 9:
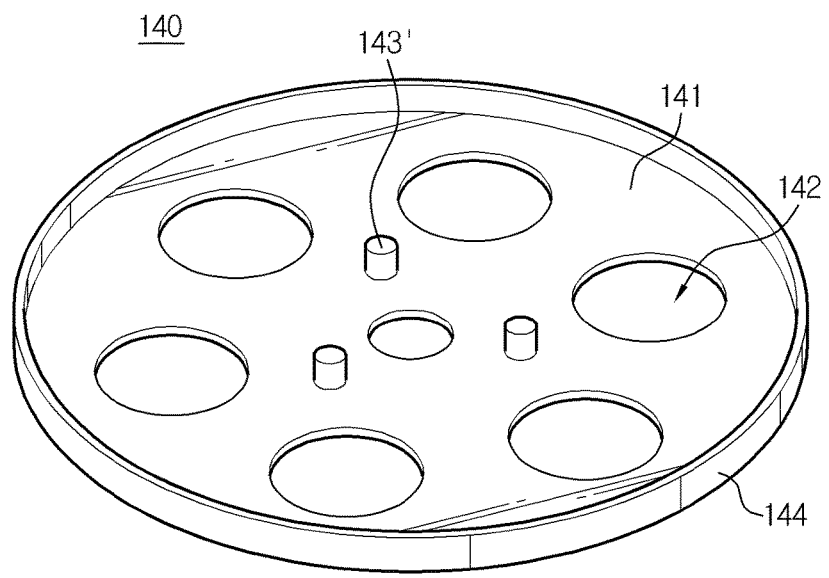

FIG. 9 shows another example of the negative electrode inner terminal 140. As shown in the figure, the spacer 143' may be provided by a rod-shaped or stick-shaped protruding structure formed by partially protruding the plane of the terminal body 141 so as to provide a spacing function so that different inner terminals 140 are not engaged with each other when being overlapped with each other during an automation process. In FIG. 9, the spacer 143' is positioned only in the circumferential direction around the hole 142 formed at the center of the terminal body 141, but the spacer 143' may be formed at any location capable of giving a spacing function.

Though not shown in the figure, as an alternative, the spacer may be provided by an embossing process in which a convex structure is repeatedly formed on the plane of the terminal body 141. In this case, similarly, the embossing pattern may be symmetrically formed about the center of the terminal body 141 to give a balanced spacing function.

Figure 10:
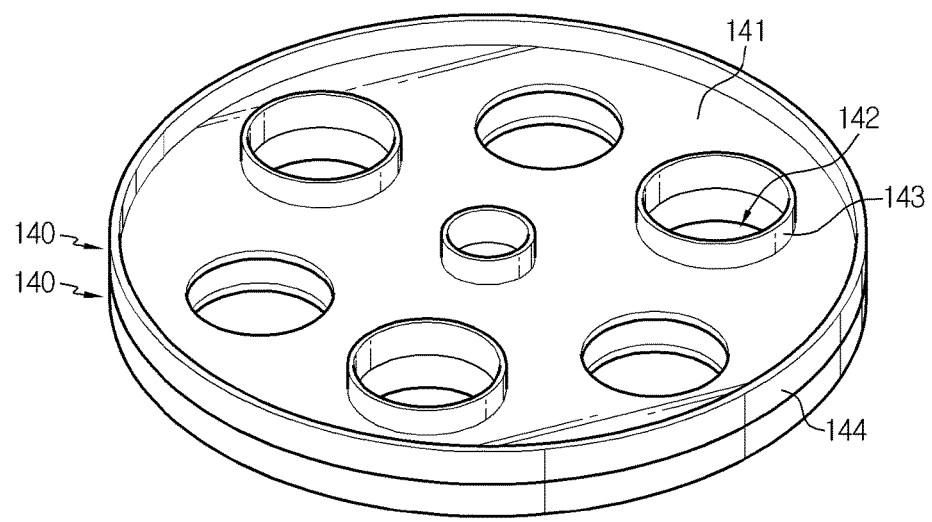
FIG. 10 is a perspective view showing that negative electrode inner terminals provided according to an embodiment of the present disclosure are vertically overlapped with each other.

According to the above configuration, even though one inner terminal 140 overlaps with another inner terminal 140 during the automation process as shown in FIG. 10, the spacer 143 protruding from the plane of the terminal body 141 prevents the inner terminals 140 from being tightly engaged. Thus, the inner terminals may be easily separated from each other, and a damage occurring at the surface of the inner terminals may be effectively prevented.

In the embodiment and the figure as described above, it is illustrated and explained that the inner terminals having the spacer 143 is the negative electrode inner terminal 140, but the inner terminal having the spacer 143 may be applied to the negative electrode inner terminal 140 and/or the positive electrode inner terminal 111.

Figure 11:
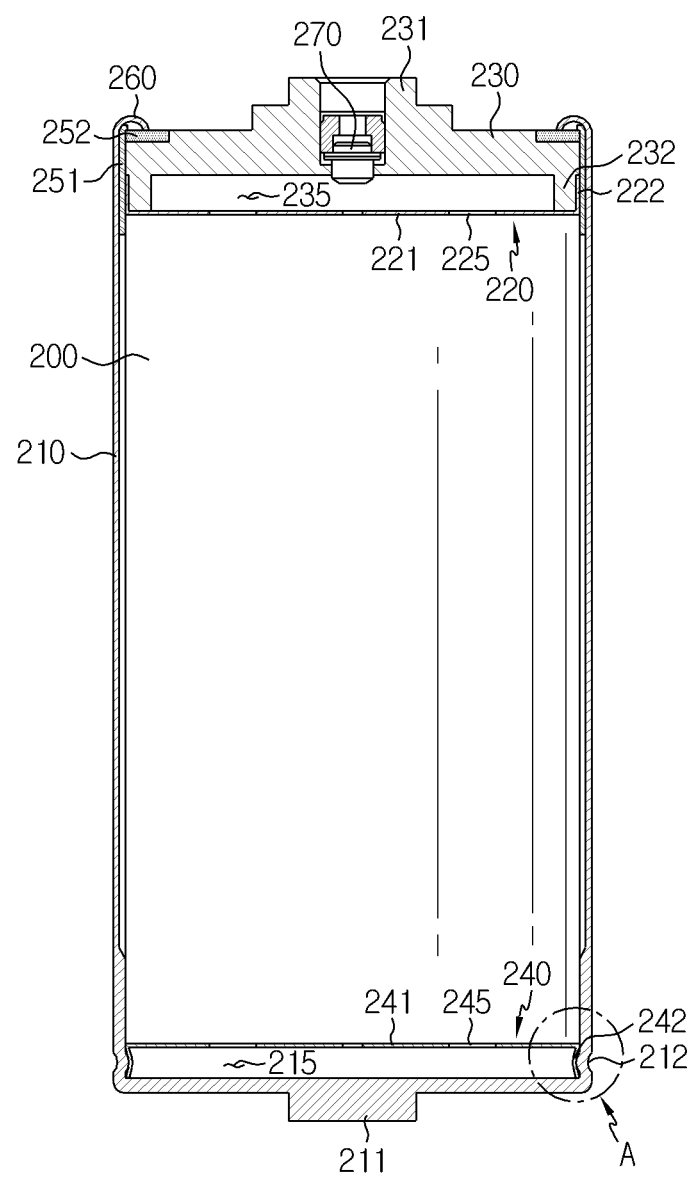
FIG. 11 is an internal sectional view showing an inside of an electric energy storage device according to another embodiment of the present disclosure.
Figure 12:
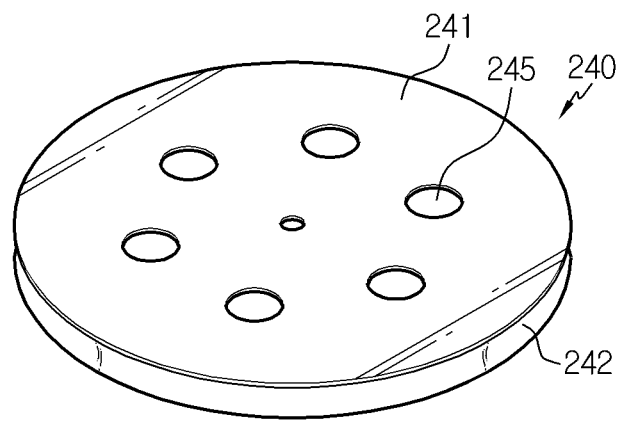
FIGS. 12 and 13 are front and rear perspective views showing the inner terminal according to the present disclosure.
Figure 13:
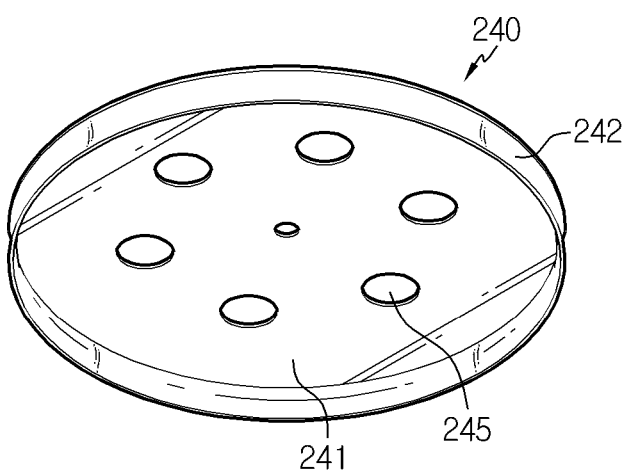
Figure 14:
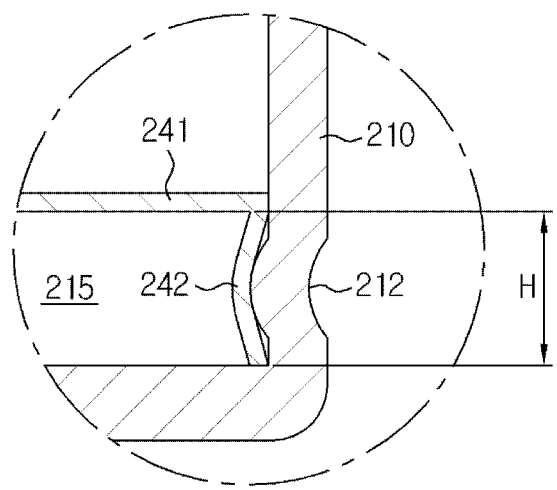
FIG. 14 is an enlarged sectional view showing a portion A of FIG. 11.

FIG. 11 is an internal sectional view showing an inside of an electric energy storage device according to another embodiment of the present disclosure, FIGS. 12 and 13 are front and rear perspective views showing the inner terminal according to the present disclosure, and FIG. 14 is an enlarged sectional view showing a portion A of FIG. 11.

Referring to FIG. 11, the electric energy storage device according to the present disclosure includes a bare cell 200, negative and positive electrode inner terminals 220, 240 respectively disposed to face positive and negative electrodes of the bare cell 200, a metal case 210 accommodating the bare cell 200 and the negative and positive electrode inner terminals 220, 240, a top plate member 230 fitted in a top portion of the metal case 210 to seal an opening and having a circular outer circumference, and negative and positive electrode outer terminals 231, 211 electrically connected to the negative and positive electrode inner terminals 220, 240 and formed at a top portion of the top plate member 230 and a lower portion of the metal case 210, respectively.

The bare cell 200 includes a positive electrode, a negative electrode, a separator, and an electrolyte to give an electrochemical energy storage function.

The metal case 210 has a cylindrical body having an inner space capable of accommodating the bare cell 200 which is processed as a wound element. Preferably, the metal case 210 may be made in the form of an aluminum cylinder. In addition, the metal case 210 includes a positive electrode outer terminal 211 electrically connected to the positive electrode inner terminal 240 and formed at the center of the lower end thereof to protrude downwards. In addition, the metal case 210 may have a curling unit 260 bent inwards from the top to fix the top plate member 230. The inner pressure of the metal case 210 may be maintained by the curling unit 260. Here, the top plate member 230 may have an airtight insulation member 252 provided at a portion where the curling unit 260 is located.

In addition, the metal case 210 may be formed such that a portion of a side thereof located corresponding to the positive electrode inner terminal 240 is formed to have a relatively greater thickness than the other portion of the side.

The top plate member 230 is fitted in the top portion of the metal case 210 to seal the opening and has a plate-like structure with a circular outer circumference. In addition, the top plate member 230 includes a negative electrode outer terminal 231 formed at the center of the top end thereof to protrude upward and electrically connected to the negative electrode inner terminal 220. In addition, the top plate member 230 may have a hollow used as a path for injecting an electrolyte and an air vent for vacuum operation, and a safety valve 270 for discharging the increased pressure in the metal case 210 to the outside may be installed in the hollow.

The negative electrode inner terminal 220 and the positive electrode inner terminal 240 are disposed to face the negative electrode and the positive electrode of the bare cell 200, respectively, in the metal case 210.

The positive electrode inner terminal 240 is disposed at the bottom surface of the metal case 210, is electrically connected to the positive electrode of the bare cell 200, and comes into contact with the metal case 210 to be connected to the positive electrode outer terminal 211 provided at the center of the lower end of the metal case 210. In addition, the negative electrode inner terminal 220 is disposed in the opening of the metal case 210, is electrically connected to the negative electrode of the bare cell 200, and is insulated from the metal case 210 by the insulation member 251 as well as comes into contact with the top plate member 230 to be connected to the negative electrode outer terminal 231 provided at the center of the top end of the top plate member 230. At this time, the negative and positive electrode inner terminals 220, 240 and the bare cell 200 may be coupled to make surface contact by means of laser or ultrasonic welding.

The negative and positive electrode inner terminals 220, 240 may include terminal bodies 221, 241 with a disk shape having one side facing the bare cell 200 and coupled in surface contact with the bare cell 200, and flanges 222, 242 extending vertically from the other side edges of the terminal bodies 221, 241 and having a cylindrical shape. Though not shown in the figures, it is preferable that a spacer is formed to protrude at the top surface of the terminal bodies 221, 241 of the negative and positive electrode inner terminals 220, 240 as in the former embodiment.

In addition, a plurality of holes 225, 245 may be formed in the plane of the terminal bodies 221, 241 of the negative and positive electrode inner terminals 220, 240, respectively. The plurality of holes 225, 245 are used to give a path for supplying an electrolyte, injected through the hollow of the top plate member 230, to the bare cell 200.

More specifically, the electric energy storage device according to the present disclosure may have an inner terminal as shown in FIGS. 12 to 14, in which the positive electrode inner terminal 240 is coupled and fixed by being transformed together with the metal case 210 by a beading process.

The positive electrode inner terminal 240 includes a terminal body 241 with a disk shape having one side facing the positive electrode of the bare cell 200 and coupled in surface contact thereto, and a flange 242 having a cylindrical shape and extending vertically from the other edge of the terminal body 241. A plurality of holes 245 are formed in the plane of the terminal body 241 to give a path for injecting an electrolyte.

The positive electrode inner terminal 240 is located at the bottom surface of the metal case 210. The metal case 210 has a beading portion 212 formed by partially beading the side of the positive electrode inner terminal 240 at a location corresponding to the flange 242 so as to be closely adhered together with the deformation of the flange 242, and the positive electrode inner terminal 240 is fastened and fixed by the beading portion 212.

The flange 242 of the positive electrode inner terminal 240 may be formed to have a height H greater than the height of the beading portion 212 formed at the metal case 210. In addition, a side of the metal case 210 at a location corresponding to the positive electrode inner terminal 240 positioned at the bottom surface have a relatively greater thickness than the other portions of the side, and in this case, the flange 242 may be formed with a height lower than the height of the thicker side of the metal case 210. With this configuration, as the positive electrode inner terminal 240 is fastened and fixed to the metal case 210, an inner space 215 may be provided between the bottom surface of the metal case 210 and the flange 242 and utilized as a place for reducing the pressure inside the metal case 210.

Figure 15:
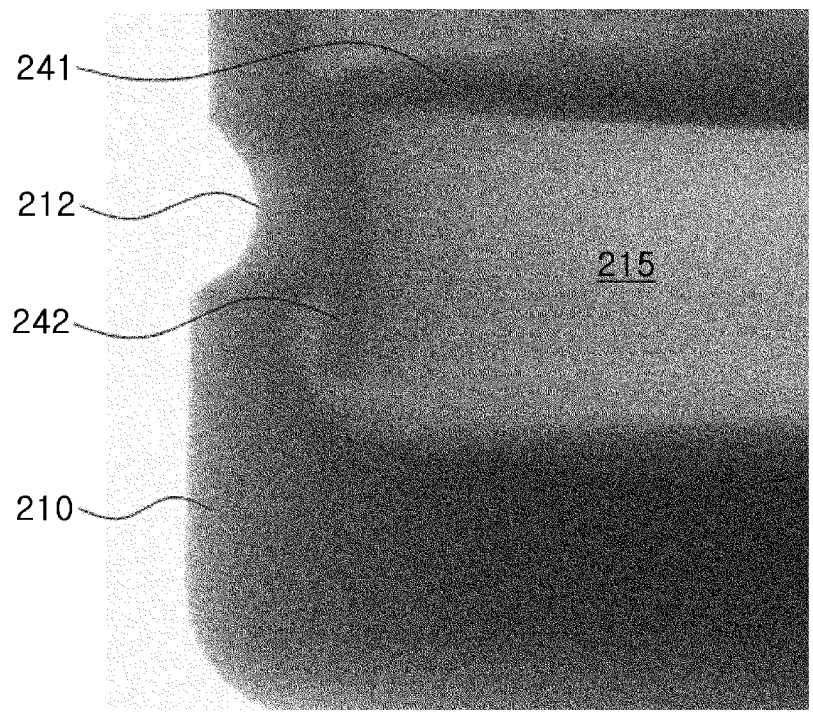
FIG. 15 is an X-ray photograph showing an actual sectional structure of the electric energy storage device according to the present disclosure.

FIG. 15 is an X-ray photograph showing an actual sectional structure of the electric energy storage device according to the present disclosure. Referring to FIG. 15, it may be found that, when the present disclosure is applied, the beading portion 212 of the metal case 210 formed by the beading process is closely adhered and tightly fixed to the flange 242 while deforming the flange 242 of the positive electrode inner terminal 240 like a groove form, and the inner space 215 is formed in the positive electrode inner terminal 240.

Figure 16:
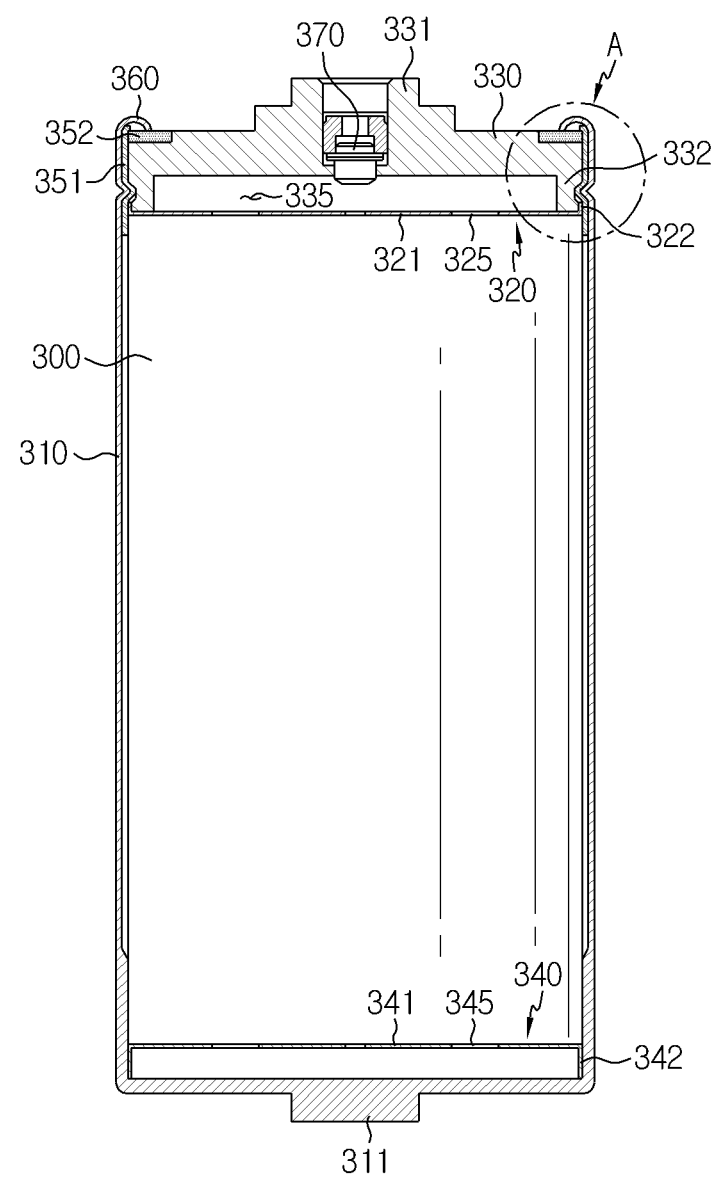
FIG. 16 is an internal sectional view showing an inside of an electric energy storage device according to another embodiment of the present disclosure.
Figure 17:
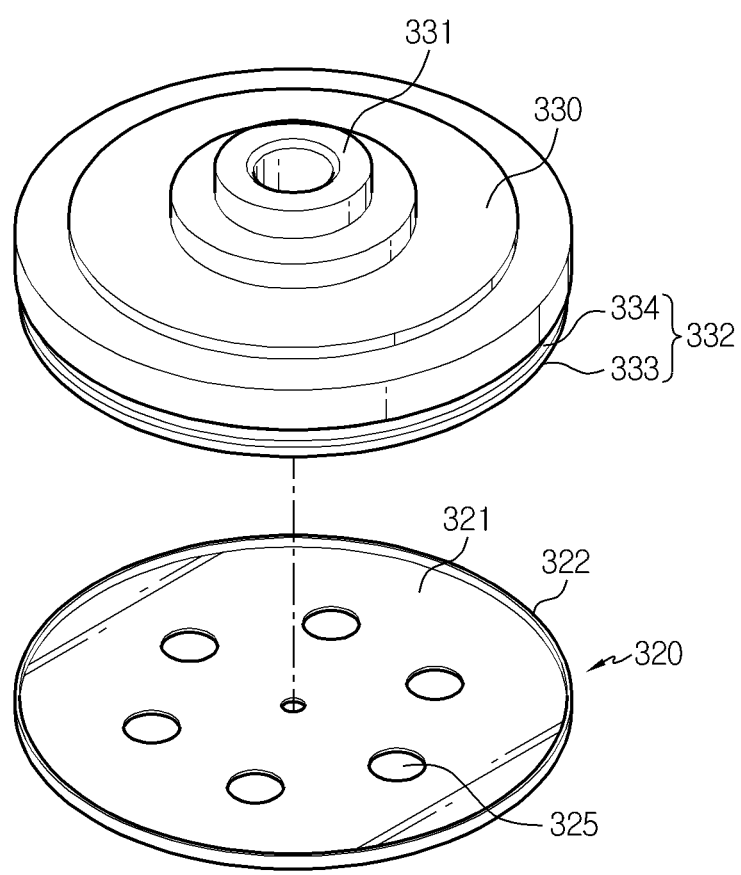
FIGS. 17 to 19 are front, rear and side exploded perspective views showing a terminal structure according to the present disclosure.
Figure 18:
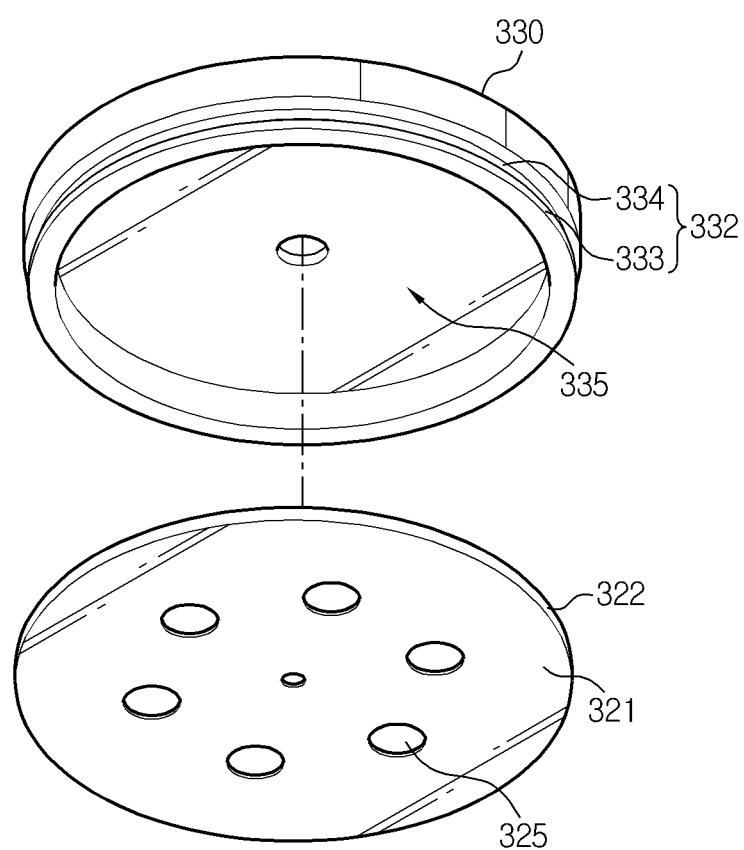
Figure 19:
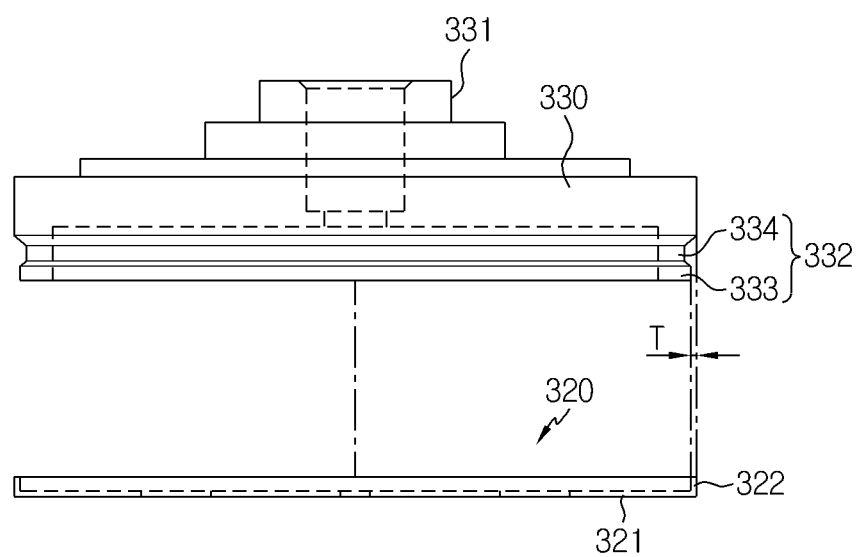

FIG. 16 is an internal sectional view showing an inside of an electric energy storage device according to another embodiment of the present disclosure, FIGS. 17 to 19 are front, rear and side exploded perspective views showing a terminal structure according to the present disclosure, FIG.

Figure 21:
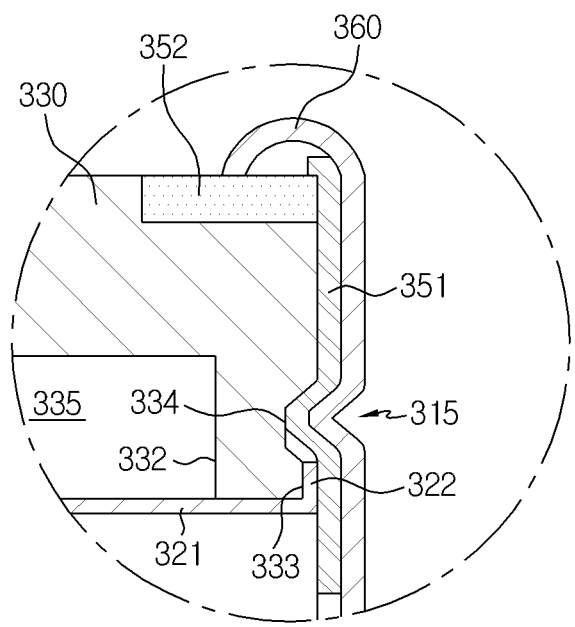
FIG. 21 is an expanded sectional view showing a portion A of FIG. 16.

20 is a cross-sectional view showing another example of a top plate member, employed in the electric energy storage device according to the present disclosure, and FIG. 21 is an expanded sectional view showing a portion A of FIG. 16.

Referring to FIG. 16, the electric energy storage device according to the present disclosure includes a bare cell 300, negative and positive electrode inner terminals 320, 340 respectively disposed to face a negative electrode and a positive electrode of the bare cell 300, a metal case 310 accommodating the bare cell 300 and the negative and positive electrode inner terminals 320, 340, a top plate member 330 fitted in the top portion of the metal case 310 to seal the opening and having a circular outer circumference, and negative and positive electrode outer terminals 331, 311 electrically connected to the negative and positive electrode inner terminals 320, 340 and formed at an upper portion of the top plate member 330 and a lower portion of the metal case 310, respectively.

The bare cell 300 includes a positive electrode, a negative electrode, a separator, and an electrolyte to give an electrochemical energy storage function.

The metal case 310 has a cylindrical body having an inner space for accommodating the bare cell 300 which is processed as a wound element. Preferably, the metal case 310 may be made in the form of an aluminum cylinder. In addition, the metal case 310 includes a positive electrode outer terminal 311 is electrically connected to the positive electrode inner terminal 340 and formed at the center of the lower end thereof to protrude downwards. In addition, the metal case 310 may have a curling unit 360 bent inwards from the top to fix the top plate member 330. The inner pressure of the metal case 310 may be maintained by the curling unit 360. Here, the top plate member 330 may have an airtight insulation member 352 provided at a portion where the curling unit 360 is disposed.

In addition, the metal case 310 may be formed such that a portion of its side at a position corresponding to the positive electrode inner terminal 340 located at the bottom surface has a relatively greater thickness than the other portion of the side.

The top plate member 330 is fitted in the top portion of the metal case 310 to seal the opening and has a plate-like structure with a circular outer circumference. In addition, the top plate member 330 includes a negative electrode outer terminal 331 formed at the center of the top end thereof to protrude upward and electrically connected to the negative electrode inner terminal 320. In addition, the top plate member 330 may have a hollow used as a path for injecting an electrolyte and an air vent for the vacuum operation, and a safety valve 370 for discharging the increased pressure in the metal case 310 to the outside may be installed in the hollow.

The negative electrode inner terminal 320 and the positive electrode inner terminal 340 are disposed to face the negative electrode and the positive electrode of the bare cell 300, respectively, in the metal case 310.

The positive electrode inner terminal 340 is disposed at the bottom surface of the metal case 310, is electrically connected to the positive electrode of the bare cell 300, and comes into contact with the metal case 310 to be connected to the positive electrode outer terminal 311 provided at the center of the lower end of the metal case 310. In addition, the negative electrode inner terminal 320 is disposed in the opening of the metal case 310, is electrically connected to the negative electrode of the bare cell 300, and is insulated from the metal case 310 by the insulation member 351 as well as comes into contact with the top plate member 330 to be connected to the negative electrode outer terminal 331 provided at the center of the top end of the top plate member 330. At this time, the negative and positive electrode inner terminals 320, 340 and the bare cell 300 may be coupled to make surface contact by means of laser or ultrasonic welding.

The negative and positive electrode inner terminals 320, 340 may include terminal bodies 321, 341 with a disk shape having one side facing the bare cell 300 and coupled in surface contact with the bare cell 300, and flanges 322, 342 extending vertically from the other side edges of the terminal bodies 321, 341 and having a cylindrical shape. Though not shown in the figures, it is preferable that a spacer is formed to protrude at the top surfaces of the terminal bodies 321, 341 of the negative and positive electrode inner terminals 320, 340 as in the former embodiment.

In addition, a plurality of holes 325, 345 may be formed in the plane of the terminal bodies 321, 341 of the negative and positive electrode inner terminals 320, 340. The plurality of holes 325, 345 are used to give a path for supplying an electrolyte, injected through the hollow of the top plate member 330, to the bare cell 300.

More specifically, the electric energy storage device according to the present disclosure may have a terminal structure as shown in FIGS. 17 to 19, in which the negative electrode inner terminal 320 and the top plate member 330 having the negative electrode outer terminal 331 electrically connected to the negative electrode inner terminal 320 are integrally formed.

The negative electrode inner terminal 320 includes a terminal body 321 with a disk shape having one side facing the negative electrode of the bare cell 300 and coupled in surface contact thereto, and a flange 322 having a cylindrical shape and extending vertically from the other edge of the terminal body 321. A plurality of holes 325 are formed in the plane of the terminal body 321 to give a path for injecting electrolyte.

The top plate member 330 includes a coupling protrusion 332 formed at a lower side thereof concentrically with the circular outer circumference and protruding to open the inside of the top plate member 330, and the top plate member 330 is inserted into the flange 322 of the negative electrode inner terminal 320 to form an inner space 335 between the top plate member 330 and the negative electrode inner terminal 320.

Figure 20:
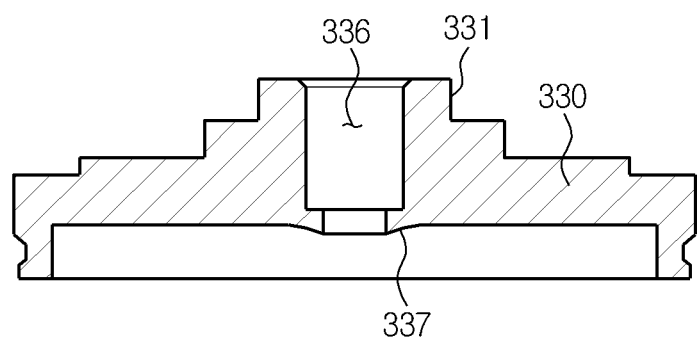
FIG. 20 is a cross-sectional view showing another example of a top plate member, employed in the electric energy storage device according to the present disclosure.

Meanwhile, as shown in FIG. 20, the top plate member 330 may include a safety valve 370 installed thereto, and a hollow 336 used as a path for injecting an electrolyte may be formed thereat. At this time, an electrolyte leakage prevention unit 337 having a gradient to protrude downwards may be further formed around the hollow 336 at the lower surface of the top plate member 330. When the safety valve 370 is opened since the inner pressure increases in a state where the top plate member 330 is directed downwards, the electrolyte leakage prevention unit 337 prevents the release of the internal gas as well as the leakage of the electrolyte to the outside.

The coupling protrusion 332 of the top plate member 330 is formed to be dented from the circular outer circumference corresponding to the thickness T of the flange 322 of the negative electrode inner terminal 320 so that the coupling protrusion 332 is inserted into the negative electrode inner terminal 320, and the flange 322 of the negative electrode inner terminal 320 may be with a lower height than the height of the coupling protrusion 332 of the top plate member 330. In addition, the coupling protrusion 332 of the top plate member 330 may be coupled by means of laser welding in a state of being inserted into the flange 322 of the negative electrode inner terminal 320.

Preferably, as shown in FIG. 21, the coupling protrusion 332 of the top plate member 330 may have a beading groove 334 formed along the outer circumferential surface thereof, and a coupling portion 333 may be formed at a lower end of the beating groove 334 to be coupled with the flange 322 of the negative electrode inner terminal 320. In this case, the flange 322 is formed with a height corresponding to the height of the coupling portion 333, so that a beading portion 315 formed by beading the metal case 310 is formed so as to be closely adhered only to the beading groove 334. As the top plate member 330 and the inner terminal 120 are integrally coupled to each other, an inner space 335 may be provided between the top plate member 330 and the inner terminal 120 and utilized as a space capable of lowering the pressure inside the metal case 310.

Meanwhile, though not shown in the figures, the beading groove 334 may be formed in the coupling protrusion 332 of the top plate member 330 as a whole, and the flange 322 of the negative electrode inner terminal 320 may be formed with a height enough to cover the beading groove 334, so that the beading portion 315 formed by beading the metal case 310 is closely adhered to the beading groove 334 together with the deformation of the flange 322.

INDUSTRIAL APPLICABILITY

When the present disclosure is applied to an automation process for producing an electric energy storage device, it is possible to increase the production efficiency and realize an electric energy storage device with improved stability and resistance characteristics.

The invention claimed is:

1. An electric energy storage device having an inner terminal disposed in a cylindrical metal case and connected to an electrode of a bare cell,
   wherein the inner terminal includes:
      a plate-shaped terminal body having a circular outer circumference;
      at least one electrolyte impregnation hole formed through the terminal body in a thickness direction;
      a flange located at the outer circumference of the terminal body and extending perpendicular to a plane of the terminal body; and
      a spacer formed to protrude at a periphery of at least one impregnation hole among the impregnation holes or formed by protruding a part of the plane of the terminal body,
   wherein, among the impregnation holes, any one impregnation hole is formed so that a center thereof coincides with a center of the terminal body, and the other impregnation holes are formed to have the same distance between centers of adjacent impregnation holes and formed along a circumferential direction to have the same distance from the center of the terminal body, and
   wherein, among the impregnation holes formed along a circumferential direction based on the center of the terminal body, the impregnation holes having the spacer and the impregnation holes not having the spacer are alternately located.

2. The electric energy storage device according to claim 1,
   wherein the impregnation holes having the spacer are arranged in a triangular form based on the center of the terminal body.

3. The electric energy storage device according to claim 1,
   wherein the spacer is formed to be perpendicular to the plane of the inner terminal body or to have a predetermined angle thereto.

4. The electric energy storage device according to claim 1,
   wherein the terminal body is provided to face the bare cell and coupled thereto to make surface contact,
   wherein a portion of a side of the metal case corresponding to the inner terminal is formed to have a greater thickness than another portion of the side,
   wherein the flange is formed to have a lower height in comparison to the height of the thick side of the metal case, and
   wherein a beading portion is formed at the metal case by beading a part of a side of the inner terminal at a portion corresponding to the flange so that the beading portion is closely adhered to the flange when the flange is deformed, and the inner terminal is secured and fixed by means of the beading portion.

5. The electric energy storage device according to claim 1,
   wherein the flange of the inner terminal is formed to have a greater height in comparison to the height of a beading portion formed at the metal case.

6. An electric energy storage device having an inner terminal disposed in a cylindrical metal case and connected to an electrode of a bare cell,
   wherein the inner terminal includes:
      a plate-shaped terminal body having a circular outer circumference;
      at least one electrolyte impregnation hole formed through the terminal body in a thickness direction;
      a flange located at the outer circumference of the terminal body and extending perpendicular to a plane of the terminal body; and
      a spacer formed to protrude at a periphery of at least one impregnation hole among the impregnation holes or formed by protruding a part of the plane of the terminal body,
   wherein a protruding height of the spacer is 80 to 120% of the height of the flange.

7. An electric energy storage device having an inner terminal disposed in a cylindrical metal case and connected to an electrode of a bare cell,
   wherein the inner terminal includes:
      a plate-shaped terminal body having a circular outer circumference;
      at least one electrolyte impregnation hole formed through the terminal body in a thickness direction;
      a flange located at the outer circumference of the terminal body and extending perpendicular to a plane of the terminal body;
      a spacer formed to protrude at a periphery of at least one impregnation hole among the impregnation holes or formed by protruding a part of the plane of the terminal body; and
      a top plate member fitted in a top portion of the metal case to seal an opening of the metal case, the top plate member having a circular outer circumference,
   wherein the top plate member includes a coupling protrusion formed at a lower side thereof concentrically with the circular outer circumference and protruding to open the inside thereof, and the top plate member is inserted into the flange of the inner terminal to give an inner space between the top plate member and the inner terminal, wherein a hollow is formed at a center of the top plate member to inject an electrolyte, and wherein an electrolyte leakage prevention unit having a gradient to protrude downwards is formed around the hollow at the lower surface of the top plate member.

8. The electric energy storage device according to claim 7, wherein the flange of the inner terminal is formed to have a smaller height in comparison to the height of the coupling protrusion of the top plate member, and wherein the coupling protrusion of the top plate member is dented inwards from the circular outer circumference corresponding to the thickness of the flange of the inner terminal.

9. The electric energy storage device according to claim 8, wherein the flange of the inner terminal is coupled to the coupling protrusion of the top plate member by means of laser welding.

10. The electric energy storage device according to claim 8, wherein the coupling protrusion of the top plate member has a beading groove formed along an outer circumferential surface thereof, and a coupling portion formed at a lower end thereof and coupled to the flange of the inner terminal, and wherein the flange of the inner terminal is formed to have a height corresponding to the coupling portion, and a beading portion is formed at the metal case so that the beading portion is closely adhered only to the beading groove.

11. The electric energy storage device according to claim 8, wherein the coupling protrusion of the top plate member has a beading groove formed along an outer circumferential surface thereof, and wherein the flange of the inner terminal is formed with a height enough to cover the beading groove, and a beading portion is formed at the metal case so that the beading portion is closely adhered to the beading groove when the flange of the inner terminal is deformed.

12. An electric energy storage device having an inner terminal disposed in a cylindrical metal case and connected to an electrode of a bare cell, wherein the inner terminal includes a plate-shaped terminal body having a circular outer circumference and a flange located at the outer circumference of the terminal body and extending perpendicular to a plane of the terminal body, wherein the electric energy storage device comprises a top plate member fitted in a top portion of the metal case to seal an opening of the metal case, the top plate member having a circular outer circumference, wherein the top plate member includes a coupling protrusion formed at a lower side thereof concentrically with the circular outer circumference and protruding to open the inside thereof, and the top plate member is inserted into the flange of the inner terminal to give an inner space between the top plate member and the inner terminal, wherein a hollow is formed at a center of the top plate member to inject an electrolyte, and wherein an electrolyte leakage prevention unit having a gradient to protrude downwards is formed around the hollow at the lower surface of the top plate member.

* * * * *